United States Patent Office 3,510,331
Patented May 5, 1970

3,510,331
METHOD FOR PROCESSING CLAY AND
PRODUCT THEREOF
Gerhardt Talvenheimo, Basking Ridge, and Robert J. Bergmann, Irvington, N.J., assignors, by mesne assignments, to Engelhard Minerals & Chemicals Corporation, Edison, N.J., a corporation of Delaware
No Drawing. Filed June 21, 1967, Ser. No. 647,620
Int. Cl. C09c 1/42; C08h 17/06
U.S. Cl. 106—288                    11 Claims

ABSTRACT OF THE DISCLOSURE

The high shear aqueous viscosity of a paper coating grade of kaolin clay is reduced by pugging the clay in an aqueous solution of an organic carboxylic acid, preferably a hydroxy-substituted alkanoic acid such as citric acid, and washing the clay to remove the acid. The novel clay product, which has desirable high shear viscosity properties, is adapted to be formulated with adhesives, especially adhesives of the type which require acidic dispersion media, such as for example, cationic latex adhesives.

BACKGROUND OF THE INVENTION

A vast quantity of kaolin clay is used as a coating pigment by the paper industry. The clay is employed for the purpose of providing a smooth white glossy finish on the paper. In preparing these coatings, the usual practice in modern coating plants is to produce a concentrated deflocculated slip of the clay, preferably a slip containing at least about 65% clay solids, and subsequently mix this deflocculated slip with adhesive solution.

Salts of molecularly dehydrated phosphates, such as tetrasodium pyrophosphate and sodium hexametaphosphate are widely employed to disperse (defloccuate) high clay solids slurries at high rates of shear when the clay slurries are made alkaline by addition of sodium hydroxide. Thus, polyphosphate dispersing agents are especially effective with clay slurries having pH values within the range of 9 to 10. Sodium citrate is especially effective at a pH somewhat below 8. At pH values appreciably below 7, clay dispersing agents are not nearly as effective in reducing the viscosity of high solids clay slurries at high shear rates as they are at higher pH values. Therefore, these dispersing agents will not be as effective in low pH, high solids koalin clay slurries adapted to be formulated with adhesives which require acidic dispersion media, such as, for example, cationic latex adhesives.

One of the most important criterion used in selecting clay products for paper coating use is the aqueous viscosity of the clay, especially the high shear aqueous viscosity of a concentrated aqueous slip of the clay. Koalin coating pigments are therefore usually supplied with high shear viscosity specifications. The "low viscosity" or "LV" clays typically have (Hercules end point) apparent viscosities less than about 14 dyne-cm. $\times 10^5$ at a rate of shear of 1100 r.p.m. for dispersed aqueous slips of about 71% clay solids. "Medium viscosity" or "MV" clays have viscosities in excess of about 14 dyne-cm. at 1100 r.p.m. and may go to 500 r.p.m. at 17 dyne-cm. $\times 10^5$. A clay is generally considered to be a "high viscosity" or "HV" clay when its apparent viscosity is 17 dyne-cm. $\times 10^5$ at a rate of shear less than 500 r.p.m.

Low viscosity clays are strongly preferred in modern coating plants and medium viscosity clay is preferable to high viscosity clay.

Only a limited number of clay crudes or fractionated clay crudes have a sufficiently low apparent high shear viscosity for use by modern paper coating plants. Of these clays very few are in the low viscosity class. Therefore, kaolin clays intended for high solids paper coating use are usually specially processed in order to reduce their aqueous viscosity. This treatment has generally involved working the clay with a high energy input, either by pugging a solid or semisolid mass with or without a dispersant, or by working a fluid slip of the clay with an agitator in a mill such as, for example, a Morehouse mill.

The results have varied to a great extent with the nature of the clay being treated. Rarely, however, has the work treatment been sufficiently effective to reduce a "HV" clay to a "LV" clay such as a 2 dyne clay (clay having an apparent Hercules end point viscosity less than 2 dyne-cm. $\times 10^5$ at a rate of shear of 1100 r.p.m. for a dispersed 70–71% solids slip).

THE INVENTION

Accordingly, an object of this invention is to provide an outstandingly effective method for reducing the high shear aqueous viscosity of kaolin clay.

Another object is to provide a clay pigment material, similar to naturally-occurring kaolin clay and especially adapted to be used in high solids, low pH kaolin slurries.

Briefly stated, in accordance with this invention, the high shear aqueous viscosity of kaolin clay is reduced by prolonger viscous kneading (pugging) of a clay-water mass which has been artificially flocculated by the addition of a small amount of a water-soluble alkanoic or alkanedioc acid acid, preferably a water-soluble polyfunctional hydroxy-carboxylic acid such as citric acid which is capable of chelating polyvalent metallic cations. The carboxylic acid (or hydroxy-substituted acid) is removed from the clay by washing before the clay is prepared into a dispersed slip, especially a dispersed acidic slip for subsequent coating color preparation.

The results that have been achieved indicate that the process affords a method for working kaolin throughout a period of maximum and continuous particle disorganization, whereby a remarkable amount of viscosity improvement is achieved.

The process of the invention results in the provision of kaolin clay coating pigments which may be efficiently dispersed in acid media at clay solids levels normally possible only with alkaline dispersed systems. Thus, high solids deflocculated slips containing kaolin clay products of the prior art generally have a pH above 7, usually about 7.5 to 8.5, when they are formulated at a dispersant level producing minimum Hercules end point viscosity. When the pH of these slips is reduced appreciably below 7, especially below about 6.5, the slips tend to thicken significantly. A slip at 71% solids may be fluid at a pH of 7.5, but may flocculate and become semisolid and nonpumpable at a pH of 6. High solids slips of clay products of the invention, in contrast, exhibit minimum high shear viscosity at pH values well below 7, typically at pH values of 4.5 to 6.5. We have, in fact, produced novel clay products capable of forming dispersed slips which are fluid at solids as high as 74–75% in spite of the fact that these slips are distinctly acidic.

The process of the invention also brings about a reduction in the particle size of the clay simultaneously while reducing the viscosity of the clay. Particle size distribution of samples of clay before and after being worked with citric acid indicate that clay fines tend to be produced when the clay is worked in the presence of citric acid solution. An aspect of the invention thus entails the provision of a novel method for reducing the particle size of kaolin clays.

PRIOR ART

We are aware that it has been suggested to reduce the aqueous viscosity of kaolin clays by high energy working of the clays. U.S. 2,535,647 to Millman teaches a process for reducing the viscosity of kaolin clay by viscous kneading in an open vessel of a deflocculated clay-water mass. This is the antithesis of the present invention, an essential feature of which resides in the processing of an artificially flocculated clay-water mass. U.S. 2,907,666, also to Millman, describes a process in which the clay in its natural state or condition is pugged in a closed mill. Our process, in contrast, does not require a closed mill. Moreover, the process of the invention is markedly more effective, as will be shown hereinafter, than a process in which the clay is worked in its natural state or condition.

We are also aware that it has been proposed to pug clay which has been flocculated with sulfuric, hydrochloric or phosphoric acids and then reduce the viscosity by treating the clay hydrothermally (U.S. 3,301,691 to Hemstock et al.). As described in that patent, little if any viscosity reduction is achieved during the pugging step when the clay is a fine size fraction of kaolin. The actual viscosity reduction is accomplished during the subsequent high pressure-hot water treatment and not during the pugging step. Our process, which utilizes organic carboxylic acid, is eminently effective in reducing the viscosity of these fine size fractions of kaolin by viscous kneading per se. Moreover, we have found that the acids we employ only mildly attack the kneading equipment whereas the prior acids may be highly corrosive when employed in the intensive pugging treatment used in practicing the present invention.

DESCRIPTION OF THE INVENTION

The invention is applicable to improving the viscosity of kaolin clays of all particle size distributions. Thus, the process works well with fine size fractions of kaolin, coarse size fractions of kaolin and other fractionated clays. The process is especially effective with clays which contain stacked aggregates of kaolin platelets. Domestic and foreign clays, including English clays, may be employed. These clays may be of primary or sedimentary origin.

Preferably, the clays are processed at least to the extent that coarse grit is removed. This is desirable in order to minimize wear on the pug mill. Naturally-occurring (acidic) kaolins are preferably used, although so-called "predispersed" clays can be used provided the acid employed in the pugging step is in excess of that required to neutralize the dispersant which had been added to the clay during processing such as spray drying.

The preferred acid from a standpoint of performance is citric acid (2-hydroxy-1,2,3-propane tricarboxylic acid). Other soluble hydroxy-alkanoic acids and hydroxy-alkanedioic acids include glycolic acid (hydroxy ethanoic acid), tartaric acid (dihydroxybutane dioic acid), malic acid (hydroxysuccinic acid), hydroxybutyric acid and lactic acid. Water-soluble unsubstituted alkanoic and alkanedioic acids include formic, acetic, oxalic (ethanedioic), malonic (propanedioic), succinic (butanedioic) and glutaric (pentanedioic) acids.

The quantity of acid employed is within the range of about ¼% to about 25% of the dry weight of the clay (calculated on an anhydrous acid basis). Especially recommended is the use of acid in amount within the range of 3% to 15% of the weight of the clay. The optimum quantity will, as expected, vary with the acid species and with the nature of the clay being treated.

The quantity of water employed is such as to provide a plastic puggable mixture with the clay and the acid. This quantity will vary with the nature of the clay and with the species and quantity of the acid. Acid concentrations within the range of ¼% to 25% by weight (anhydrous acid basis) are feasible. In most instances acid concentrations of 5% to 20% will be employed. The acid concentration will vary during pugging as a result of loses of water due to evaporation and the subsequent additions of water to maintain the mass in plastic, puggable condition.

During the pugging step the clay solids are usually maintained within the range of about 65% to about 85% (i.e., 65 to 85 parts bone dry clay to 35 to 15 parts by weight water). This may necessitate addition of water or acid solution when an open pug mill is used.

Various procedures can be employed in carrying out the viscous kneading or pugging step. For example, pure acid can be blended with clay before water is added. When this procedure is followed and the pugging is in an open mill, water and/or acid solution are normally added during the pugging operation to maintain the clay in a puggable state or condition. Another procedure is to add all of the acid as a solution, gradually adding either water or more solution of the same or different acid concentration to maintain the clay in a puggable condition. Another procedure is to add all of the acid as a solution, gradually adding either more solution or water. As another possibility, the clay can be pugged with water and, while the pugger is in operation, pure acid or acid solution may be added.

The working step can be carried out in any agitating equipment capable of kneading the moist clay mix. Pug mills of the worm or screw type, such as are employed by the clay industry, can be used, as can pug mills which are provided with sigma blades. The mixing equipment can be batch type or continuous and it can be opened or closed. Suitable mills operate on the clay in a manner such as to shear moist clay particles, one over the other, by a kneading action (as opposed to a shattering or grinding action).

After pugging, the acid should be removed from the clay. This can be acomplished satisfactorily by washing the pugged clay with water. The acid should be removed before the clay is dried in order to avoid reaction between the clay and the acid. After the clay has been washed, it can be made down in a slip employing the usual deflocculating agents such as, for example, sodium hexametaphosphate. For coating color use, these slips normally contain at least 65% solids. The deflocculated slips can be spray dried to provide predispersed clay products. If desired, the clay may be dried and pulverized after washing.

Any of the adhesives commonly used by the paper coating industry may be employed in producing clay coating colors containing the treated clay of the invention. These adhesives include, by way of example, starch, casein and butadiene-styrene latex. As mentioned above, the treated clay are uniquely adapted for use in coating colors containing cationic starch adhesives.

EXAMPLES OF THE INVENTION

In the illustrative examples which follow, all viscous kneading (pugging) was carried out in an open pug mill. The mill was a 1600 cc. capacity sigma blade Read mixer.

In all runs, the pug mill was charged with 600 gm. of dry clay and 250 cc. liquid (water or acid solution). These slips initially contained 70.6% clay solids. During some of the runs, the temperature rose, causing water to evaporate. To compensate for the loss of water and to maintain the charge in the Read mixer in puggable consistency, water or acid solution was periodically added when required. Total pugging time was 6 hours in all tests.

In all cases in which acid had been added to the liquid in the pug mill, the pugged clay was washed on a Buchner funnel with distilled water to a minimum specific resistance of 8,000–10,000 ohm-cm. before the pugged clay was dried at 110° C. and pulverized.

All high shear viscosity data refer to values obtained with Hercules Hi-Shear viscometer. The Hercules viscometer is a rotational instrument which automatically traces a continuous plot of torque versus rate of shear over a rate of shear range of 0 to 4540 reciprocal seconds. The instrument is described in an article by J. W. Smith and P. D. Applegate, "The Hercules Hi-Shear Viscometer," Paper Trade Journal 126, No. 23, 60–66 (June 3, 1948). Since apparent viscosity is inversely proportional to rate of shear at a given shearing force (torque), a fluid of highest apparent viscosity is indicated by a rate of shear-stress curve with maximum shearing force at a maximum rate of shear.

In order to keep the degree of deflocculation and clay solids content at values approximating those employed in making down clay for paper coating use, the dry clay was agitated for 1 minute in a Waring Blendor with distilled water and $Na_4P_2O_7$ in the amount indicated. All viscosity values are reported for slips formulated with a quantity of dispersant that resulted in a slip of given solids content which had the minimum Hercules end point viscosity.

Example I.—Processing a "HV" fine size fraction of kaolin clay (A) Tests were carried out with a fine size fraction of "HV" kaolin clay which was reported to be very unresponsive to conventional viscosity reduction processes such as viscous kneading with water or intensive high shear agitation of a fluid slip of the clay. The clay was so viscous that the viscosity of a 71% solids dispersed slip containing an optimum dosage of dispersant (tetrasodium pyrophosphate) was in excess of 17.0 dyne-cm.×10 at a rate of shear of 810 r.p.m. after being intensively pugged for 5 hours with water, in accordance with the teachings of the prior art.

The clay was a "HT" fraction of a sedimentary "soft" kaolin crude from a mine near McIntyre, Ga. The "HT" fraction had been obtained by blunging the crude in water, degritting the crude to remove substantially all plus 325 mesh particles in a wet degritting system, hydroclassifying the minus 325 mesh slip in centrifugal sizers, recovering a product (the "HT" fraction) calculated to contain 78–82% by weight of particles finer than 2 microns, E.S.D., bleaching the "HT" clay with zinc hydrosulfite, thickening by addition of sulfuric acid to a pH of about about 3, filtering, washing and drying.

A sample of the "HT" clay was intensively pugged with a 5% aqueous solution of citric acid, and washed in accordance with the present invention.

The citric acid solution was prepared by dissolving 5 gm. citric acid monohydrate in 95 gm. deionized water.

The 600 gm. charge of clay was added to the Read mill and 250 ml. of the 5% citric acid solution was added. After the charge in the mill had been pugged for one-half hour, the temperature had increased from 75° F. to 109° F. While the pugger was in operation, additional 5% citric acid solution was gradually added in amount of about 20 to 30 ml. per hour. Maximum temperature was 120° F. and total pugging time was 6 hours. The total quantity of citric acid solution that was employed was 450 ml., corresponding to the use of 3.67% citric acid monohydrate, based on the dry clay weight.

Immediately after the clay was discharged from the pug mill, the clay was suspended in 1000 ml. deionized water. The suspension was filtered and washed with deionized water until the filtrate had a specific resistance of 15,000 ohm-cm. The material was dried at 110° C. for about 48 hours and then dry pulverized in an Osterizer.

In preparing a high solids deflocculated acidic slip of the clay that had been kneaded with the 5% citric acid solution, 500 gm. of the Osterized clay was added to 204 gm. distilled water containing 1.5 gm. tetrasodium pyrophosphate (0.3% based on the clay weight). The materials were agitated in a Waring Blendor at high speed for one minute. Hercules viscosity was measured. Brookfield (low shear) viscosities were also determined. The procedure was repeated with other portions of the Osterized clay using different quantities of dispersant in order to determine optimum dispersant dosage (the quantity which would produce a slip having a minimum Hercules end point viscosity).

In pugging with the 10% solution of citric acid, 250 ml. of a 10% solution of citric acid monohydrate in deionized water was added to 600 gm. of clay in the open pug mill. After one hour, additional 10% citric acid solution was gradually added until a total of 412 ml. of solution had been added, corresponding to the use of 6.87% citric acid monohydrate based on the clay weight. Temperature reached 104° F. after 3 hours of pugging and gradually increased to a maximum of 113° F. Total pugging time was 6 hours. The clay was immediately washed with deionized water to a specific resistance in excess of 8000 ohm-cm. (pH of 4.7). The washed clay was dried, pulverized and tested for viscosity under conditions identical to those used with the clay which had been kneaded with the 5% solution of citric acid.

In similar manner, a sample of the "HT" clay was kneaded with a 20% solution of citric acid monohydrate, using a total of 15.3% citric acid monohydrate based on the dry clay weight.

The results of these tests are summarized in Table I.

TABLE I.—VISCOSITY REDUCTION OF "HV" CLAY BY PUGGING WITH CITRIC ACID SOLUTIONS

| Pugging liquid | Wt. percent solids of clay slip | Wt. percent TSPP* in slip | pH of slip | Torque dyne-cm.×10⁵ | Bob speed r.p.m. |
|---|---|---|---|---|---|
| None (no pugging) | 71.2 | 0.3 | 5.9 | 17.0 | 125 |
| Water (prior art) | 71.2 | 0.5 | 6.2 | 17.0 | 810 |
| Citric acid: | | | | | |
| 5% conc. | 71.2 | 0.4 | 5.3 | 17.0 | 965 |
| 10% conc. | 71.2 | 0.4 | 5.5 | 8.3 | 1,100 |
| 20% conc. | 71.2 | 0.4 | 4.8 | 7.0 | 1,100 |
| 10% conc. | 75.2 | 0.4 | | 17.0 | 290 |
| 20% conc. | 74.6 | 0.4 | | 17.0 | 475 |

*Tetrasodium pyrosphosphate.

The data reported in Table I show that the citric acid had a pronounced effect on the aqueous high shear viscosity of the clay. Thus, a 71% solides slip of the original clay had a viscosity in excess of 17.0 dyne-cm.×10⁵ at 810 r,p,m, after being pugged with water, in accordance with the prior art. The same clay had a viscosity of only about 8 dyne-cm.×10⁵ at 1100 r.p.m. when the pugging was carried out with 10% citric acid solution followed by washing, and about 7 dyne-cm.×10⁵ at 1100 r.p.m. when the 20% citric acid solution was used. Using the 5% citric acid solution, the viscosity was reduced substantially, but not to the extent realized with acids of 10% and 20% concentrations.

The results show also that the viscosity reduction that was achieved with the 10% and 20% solutions of citric acid was so drastic that the treated clay products could be formulated into 75% solids fluid slips. This was not possible with the original "HV" clay or with the "HV" clay after it has been pugged with water alone, in accordance with the teachings of the prior art.

It is also significant to note that, in the case of all citric acid kneaded clays, deflocculated slips of minimum high shear viscosity were obtained at pH values well below 6, making these slips uniquely adapted for use in the preparation of coating colors requiring acidic media, such as coating colors made up with cationic starch adhesive. Thus, the slip of "7 dyne" clay, obtained as a result of the pugging with 20% citric acid had a pH of only 4.8. The slip of "8 dyne" clay, obtained with the 10% citric acid solution, had a pH of 5.4.

(B) Particle size distribution curves of samples of the "HV" clay were obtained before and after the various citric acid-washing treatments described under part (A) of this example. The data, summarized in Table II, show that the citric acid treatments resulted in an increase in the quantity of submicron-sized particles, with the increase being especially pronounced with the citric acid solutions of 10% and 20% concentration. It will be recalled from part A of this example that these solutions were especially effective in reducing the viscosity of the "HV" clay, producing "7 dyne" clay slip at a pH of only 4.8 for the 20% citric acid treatment and "8 dyne" clay at a pH of 5.5 for the 10% solution of the acid.

TABLE II.—EFFECT OF CITRIC ACID PUGGING ON THE PARTICLE SIZE DISTRIBUTION OF A "HV" CLAY

| Microns e.s.d. | Original "HV" clay, wt. percent | Pugged 5 hrs. with water | Pugged with 5% citric acid | Pugged with 10% citric acid | Pugged with 20% citric acid |
|---|---|---|---|---|---|
| | | Net gain (+) or Loss (−) of particles in micron size range, wt. percent | | | |
| 4 | 3 | 0 | −2 | −2 | −2 |
| 3–4 | 4 | −1 | −1 | −1 | −1 |
| 2–3 | 9 | −2 | −4 | −5 | −5 |
| 1.5–2 | 6 | 0 | −1 | −2 | −2 |
| 1.0–1.5 | 11 | −2 | −2 | −5 | −4 |
| 0.8–1.0 | 6 | −1 | −1 | −1 | −3 |
| 0.6–0.8 | 8 | +1 | 0 | −1 | −2 |
| 0.4–0.6 | 11 | | +2 | +1 | −1 |
| 0.2–0.4 | 17 | −2 | +2 | 0 | −1 |
| 0.2 | 25 | +7 | +7 | +16 | +21 |
| Average | 0.54 | 0.45 | 0.40 | 0.30 | 0.20 |

(C) The Brookfield (low shear) viscosities of the "HV" clay before and after citric acid treatment were compared in order to determine whether low shear viscosity of the clay was also reduced by the treatments. It was found that the treatment with 20% citric acid resulted in a clay having higher low shear viscosity than the original clay. In fact, the viscosity of the 71.2% slip of clay that has been treated with 20% acid was 100% more viscous than the 1.52 cp. viscosity (20 r.p.m.) for a 71.2% slip of the original clay. This result was expected from the much higher proportion of very fine particle size clay present after this treatment. However, in spite of the fact that the Brookfield (low shear) viscosity was increased, the high shear viscosity was decreased substantially, as shown above.

Example II.—Processing "HV" coarse size fraction of kaolin clay

The procedure of Example I was repeated with a coarse size fraction ("NoKarb") of McIntyre kaolin clay crude obtained in a manner similar to that employed in producing the "HT" of Example I with the exception that a coarse size fraction was recovered from the hydroclassification operation. The "NoKarb" clay contained about 50% by weight of particles larger than 2 microns and had an average size of about 5 microns. The coarse clay contained a substantial quantity of stacks or booklets of kaolinite platelets. Typical of most coarse size fractions of kaolins from the McIntyre district of Georgia, this coarse size fraction was an "HV" clay and could not be prepared into a 71% solids slip which was fluid at high rates of shear. In fact, at a bob speed of 1100 r.p.m. with the Hercules viscometer, a dispersed slip of the "NoKarb" clay containing only 62.6% solids had a torque of 8.4 dyne-cm.×10⁵.

The viscosity of the "NoKarb" clay was reduced slightly to a value of 17.0 dyne-cm.×10⁵ at 860 r.p.m. by pugging the clay with water in a Read mill for 6 hours.

(A) To determine the effect of citric acid pugging on the viscosity of this type of clay, a 600 gm. charge of the "NoKarb" clay was pugged with a 20% solution of citric acid, gradually adding the acid solution until a total of 320 ml. had been added (corresponding to 10.7% citric acid monohydrate, based on the dry clay weight). Immediately after the pugging treatment, the pugged clay was washed with deionized water to 45,000 ohm-cm. specific resistance. The washed clay was dried at 110° C., pulverized and tested for viscosity, as in the previous example. By this procedure, the viscosity of the "NoKarb" kaolin could be prepared into a 71.1% solids slip with 0.4% tetrasodium pyrophosphate and having a viscosity of 11.6 dyne-cm.×10⁵ at a bob speed of 1100 r.p.m. The pH of the 71.1% slip was 6.2. Thus by pugging the "NoKarb" clay with citric acid solution, a slip almost 9% higher in clay solids could be produced.

(B) To determine the effect of citric acid pugging on clay color (brightness), the reflectance of the pugged, washed "NoKarb" clay was measured with light having a wavelength of 457 mμ, following the TAPPI procedure. In similar manner, the brightness of a representative sample of the original "NoKarb" was tested.

It was found that the citric acid pugged clay had a brightness of 81.5%. The brightness of the original clay was only 79.8%. This result indicates that the citric acid pugging had a desirable effect on the clay brightness.

Example III.—Processing a "MV" clay

This example illustrates the application of the process of the invention to the viscosity reduction of a representative medium viscosity commercial coating clay ("ASP 600"). The clay, which was a fine size fraction of a McIntyre crude, had a particle size distribution similar to that of the "HT" clay of Example I. However, unlike the "HT" clay of Example I, this clay was very responsive to viscosity reduction by a conventional pugging technique. Nevertheless, even with the conventional pugging, this clay was not converted into a 2 dyne clay product. A 71.2% dispersed solids slip of the water pugged clay had a viscosity of 3.6 dyne-cm.×10⁵ at 1100 r.p.m. and a pH of 6.6. A 74.1% solids slip of the water-pugged clay containing 0.5% by weight tetrasodium pyrophosphate had a pH of 6.7 and a viscosity of 17.0×10⁵ dyne-cm. at 920 r.p.m. Without pugging a 70.7% solids slip (0.4% tetrasodium pyrophosphate) had a pH of 6.6 and a viscosity of 17.0 dyne-cm.×10⁵ at 600 r.p.m.

In accordance with the present invention, this clay was pugged with a 20% aqueous solution of citric acid monohydrate, using an initial charge of 250 ml. of the solution and, after 3 hours had passed, gradually adding more of the solution until a total of 385 ml. of solution had been added (12.8% citric acid monohydrate based on the dry clay weight). The pugged clay was washed with water to 25,000 ohm-cm. specific resistance and dried.

It was found that the viscosity of the washed, citric acid pugged clay was reduced to such an extent that a 74.3% solids slip of the clay had a viscosity of 15.6 dyne-cm.×10⁵ at 1100 r.p.m. This slip, which contained 0.3% tetrasodium pyrophosphate, had a pH of only 5.3.

Thus, by pugging this "MV" clay with citric acid, a kaolin product was obtained which could be prepared into a slip having "MV" characteristics in spite of the fact that (1) the slip was highly concentrated, containing 74% solids, and (2) the slip was acidic.

Data Table II, summarizing the results of studies of the effect of the citric acid pugging on the particle size distribution of the "MV" clay show that the 10% citric acid treatment brought about an exceptional (18%) increase in quantity of minus 0.4 micron particles, this increase resulting in a substantial decrease of average particle size from 0.75 micron to 0.45 micron. With the 20% citric acid solution there was a small increase in the percentage of minus 0.4 micron particles, suggesting that some of the finer particles had been reconsolidated.

TABLE III.—EFFECT OF CITRIC ACID PUGGING ON PARTICLE SIZE OF A MEDIUM VISCOSITY FINE SIZE FRACTION OF CLAY

| | ASP 600 | Pugged 6 hrs. with water | Pugged 6 hr. 10% citric acid | Pugged 6 hr. 10% citric acid |
|---|---|---|---|---|
| Average particle size, microns | 0.75 | 0.50 | 0.45 | 0.50 |
| Gain in minus 0.4 micron particles, percent | | +3 | +12 | +5 |

Example IV.—Processing artificially delaminated clay

This example illustrates an embodiment of this invention wherein the viscosity of a spray-dried artificially delaminated kaolin clay is reduced by pugging the clay in a citric acid solution. This type of clay does not respond well to conventional viscosity reduction techniques.

The clay had been obtained by artificially delaminating a "NoKarb" clay (see Example II) having an average particle size of about 5 microns. After the clay had been delaminated by agitating a slip of the clay in water with particles of a material that reduced the size of the clay, the slip was fractionated. A fine size fraction was obtained. This fraction contained 100% by weight of particles finer than 3.5 microns, 80% minus 2.3 microns and 50% minus 1.5 microns. The fine delaminated clay was dispersed with tetra-sodium pyrophosphate and spray dried.

A 62.5% solids slip of the clay containing 0.4% tetrasodium pyrophosphate dispersant had a Hercules viscosity of 17.0 dyne-cm.$\times 10^5$ at 200 r.p.m. The clay was so viscous that it could not be formulated into a 71% solids slip. Pugging the clay with water in the Read mill for 6 hours reduced the viscosity and a 70.1% solids slip of the pugged clay had a viscosity of 17.0 dyne-cm. $\times 10$ at 200 r.p.m.

In accordance with this invention, a 600 gm. sample of the spray dried clay was charged to the pug mill and 280 ml. of a 20% citric acid solution was added. An additional 110 ml. of the 20% citric acid solution was gradually added over a period of 6 hours to the charge in the pug mill. The quantity of solution added corresponds to 13.0% citric acid monohydrate, based on the dry clay weight. After the first hour of pugging, the temperature of the charge was 94° F. For the remaining 4 hours, the charge was at a temperature within the range 90–110° F. At the end of the pugging, the solids content was 81.5%. The material was removed from the pug mill after 6 hours, mixed with 1000 ml. distilled water and filtered. The filtered clay was washed with deionized water to a conductivity of 12,000 ohm-cm., dried at 110° C. for 17 hours and Osterized.

It was found that a 71.4% solids slip of the citric acid pugged clay containing 0.5% tetrasodium pyrophosphate had a pH of 6.0. This slip had a Hercules viscosity of 17.0 dyne-cm. $\times 10$ at 440 r.p.m. As mentioned, the original clay had a torque of 17.0 dyne-cm. $\times 10^5$ at only 225 r.p.m. for a slip of only 62.6% solids content. This slip had a pH of 8.2. A 71.4% slip of the citric acid-treated clay was therefore lower in viscosity than a 62.6% solids slip of the original clay in spite of the fact that the former slip had a pH of 6.0 and a 9% higher solids content. This demonstrates the outstanding effectiveness of the process of the invention in reducing the high shear viscosity of artificially delaminated kaolin clay.

We claim:

1. A method for reducing the aqueous viscosity of kaolin clay which comprises providing a mixture of said clay with an aqueous solution of an acid selected from the group consisting of alkanoic, alkanedioic, hydroxy-substituted alkanoic and hydroxy-substituted alkanedioic in amount sufficient to form a mass of puggable consistency, pugging said mixture with a high energy input until the high shear viscosity of a dispersed aqueous slip of said clay is reduced substantially and removing said acid from said pugged clay by washing, said acid being employed in proportion relative to the quantity of said clay such that the aqueous viscosity of a high solids deflocculated slip of the pugged and washed clay is significantly less than the viscosity of the clay would be if the clay had been pugged in the absence of said acid.

2. The method of claim 1 wherein said acid is present in amount within the range of ¼ to 25 gm./100 gm. dry clay.

3. The method of claim 1 wherein the concentration of said solution is within the range of about ¼% to about 25%.

4. The method of claim 1 wherein said clay is pugged in an open pug mill.

5. The method of claim 1 wherein said clay, without being dried, is washed with water after being pugged.

6. The method of claim 1 wherein said clay is a naturally-occurring kaolin containing stacked aggregates of kaolin platelets.

7. The method of claim 1 wherein said clay is a sedimentary clay which has been artificially delaminated.

8. The method of claim 1 wherein said clay is a coarse size fraction of kaolin clay, the particles of which contain stacked platelets.

9. The method of claim 1 wherein said clay is substantially free from deflocculating agent when pugged with said solution.

10. The method of claim 1 wherein said acid is an hydroxy-substituted alkanoic acid.

11. A method for reducing the high shear aqueous viscosity of kaolin clay which comprises pugging said clay with a high energy input in an aqueous citric acid solution of about 5% to about 20% concentration and containing from 3 to 15 gm. citric acid per 100 gm. dry clay and washing citric acid from the pugged clay.

References Cited

UNITED STATES PATENTS

| | | | |
|---|---|---|---|
| 1,745,102 | 1/1930 | Lambie et al. | 106—72 |
| 2,535,647 | 12/1950 | Millman et al. | 106—72 |
| 3,274,011 | 9/1966 | Duke | 106—72 |
| 3,326,705 | 6/1967 | Duke | 106—72 |

JAMES E. POER, Primary Examiner

U.S. Cl. X.R.

23—110; 106—72